United States Patent
Gordon et al.

(12) 
(10) Patent No.: US 9,179,259 B2
(45) Date of Patent: Nov. 3, 2015

(54) RECOGNIZING UNKNOWN ACTORS BASED ON WIRELESS BEHAVIOR

(75) Inventors: Scot Douglas Gordon, Redmond, WA (US); Dmitry Kaplan, Bellevue, WA (US); Raul Vera, Aliso Viejo, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 632 days.

(21) Appl. No.: 13/563,783

(22) Filed: Aug. 1, 2012

(65) Prior Publication Data

US 2014/0038553 A1   Feb. 6, 2014

(51) Int. Cl.
*H04W 24/00* (2009.01)
*H04W 4/02* (2009.01)
*H04L 29/08* (2006.01)
*H04W 12/12* (2009.01)

(52) U.S. Cl.
CPC .............. *H04W 4/023* (2013.01); *H04L 67/18* (2013.01); *H04L 67/22* (2013.01); *H04L 67/306* (2013.01); *H04W 12/12* (2013.01)

(58) Field of Classification Search
CPC ..................................................... H04W 24/00
USPC ................................................. 455/405–410
See application file for complete search history.

(56) References Cited

U.S. PATENT DOCUMENTS

| | | | |
|---|---|---|---|
| 5,940,751 A | 8/1999 | Kaplan et al. | |
| 5,956,634 A | 9/1999 | Otterson et al. | |
| 5,970,405 A | 10/1999 | Kaplan et al. | |
| 8,224,348 B2 | 7/2012 | Bolon et al. | |
| 8,346,208 B2 * | 1/2013 | Chiou et al. | 455/405 |
| 8,521,132 B2 * | 8/2013 | Washio | 455/411 |
| 2011/0191352 A1 | 8/2011 | Jones et al. | |
| 2012/0278387 A1 | 11/2012 | Garcia et al. | |

* cited by examiner

*Primary Examiner* — Michael T Vu
(74) *Attorney, Agent, or Firm* — Kaplan Breyer Schwarz & Ottesen, LLP

(57) ABSTRACT

An illustrative behavior analysis system and a corresponding method are designed to analyze telecommunications-event records and other relevant records associated with wireless terminals to infer whether a wireless user's pattern of behavior is substantially similar or even identical to the pattern of behavior of another user, possibly a known actor. A pattern of behavior typically comprises call-related and location attributes over a period of time. Accordingly, the illustrative embodiment infers an identity or a substantial similarity as between two seemingly distinct users of wireless terminals, based on: (i) how precisely a candidate's pattern of behavior matches a pre-defined pattern of behavior, and/or (ii) how precisely a candidate's pattern of behavior matches another candidate's pattern of behavior.

30 Claims, 7 Drawing Sheets

200

400

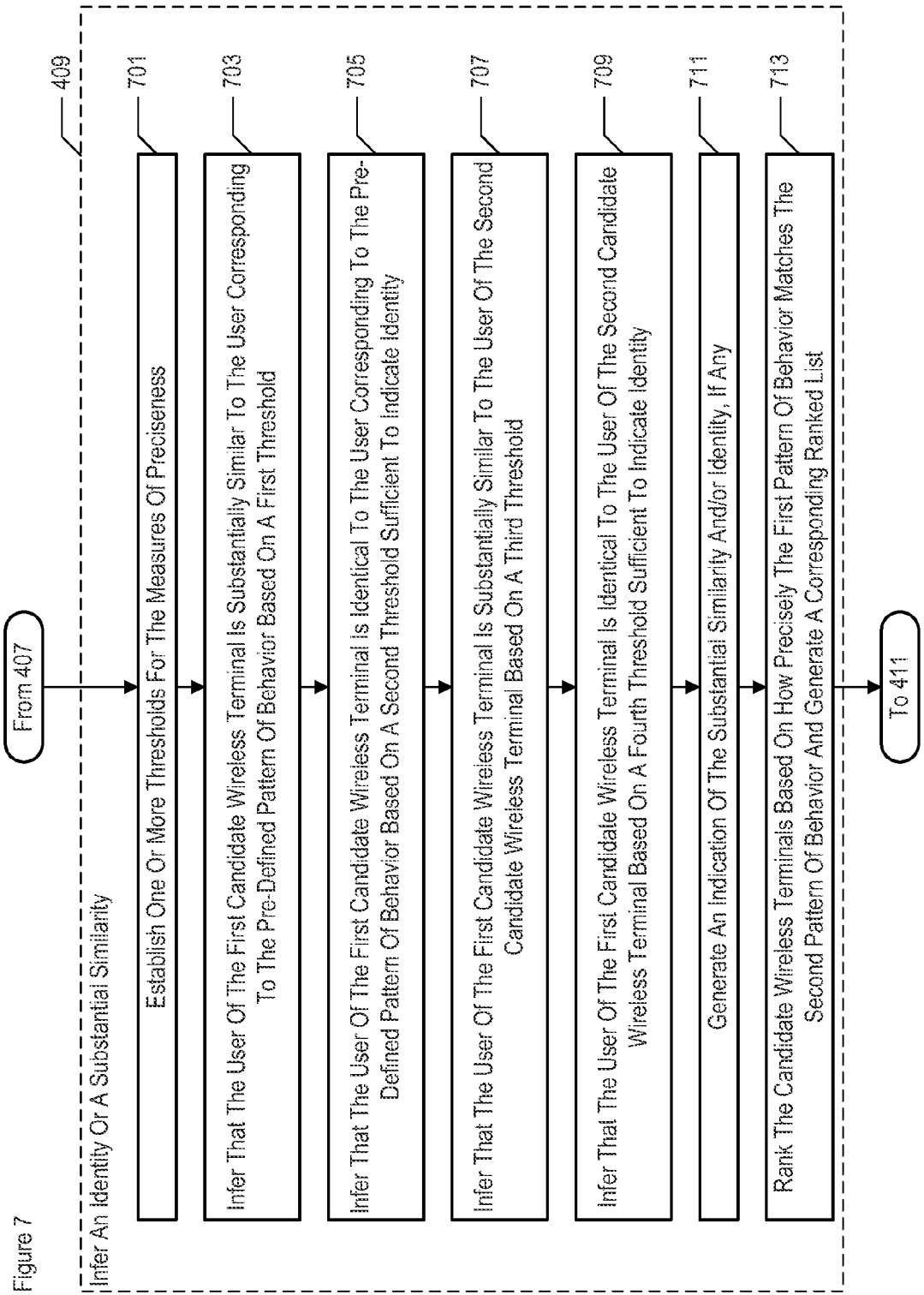

RECOGNIZING UNKNOWN ACTORS BASED ON WIRELESS BEHAVIOR

FIELD OF THE INVENTION

The present invention relates to wireless networks in general, and, more particularly, to analyzing wireless behavior.

BACKGROUND OF THE INVENTION

FIG. 1 depicts a diagram of the salient components of wireless telecommunications network 100 in accordance with the prior art. Wireless telecommunications network 100 comprises: wireless terminals 101 and 110, cellular base stations 102-1, 102-2, and 102-3, Wi-Fi base stations 103-1 and 103-2, wireless switching center 111, and location system 112. Wireless telecommunications network 100 provides wireless telecommunications service to all wireless terminals within its coverage area, in well-known fashion. Global Positioning System ("GPS") constellation 121 is also depicted in FIG. 1, but is not part of wireless network 100.

Data that is generated by wireless network 100 can provide clues to an investigator. For example, a known suspect's calling records can be obtained to determine what telephone and/or data communications that suspect has engaged in. Network-supplied calling records are well known in the art, and typically comprise one or more of:

- an International Mobile Subscriber Identity ("IMSI") number that is assigned to the wireless terminal of the subscriber, or to a removable and swappable subscriber identification module ("SIM") card that is receivable in the wireless terminal,
- the telephone number assigned to the subscriber's account,
- the origination time of the call,
- the ending time of the call,
- the origination time of a text (e.g., SMS) message,
- the receiving time of a text (e.g., SMS) message, and
- cell ID or enhanced cell ID location information (as is well known in the art) relative to the respective times, These records are often referred to as "call-detail records" or "CDRs."

Identifying potential suspects according to telephone calling records and CDRs is well known in the art, but is a limited domain. To avoid detection or surveillance, people can use disposable or pre-paid wireless terminals that cannot be traced back to a named individual. For example, a user might use wireless terminal 101 for a period of time, then deactivate it or discard it and begin using wireless terminal 110. Likewise, SIM cards can be swapped and exchanged, thus changing the wireless identity of the wireless terminal with each successive SIM card. For example, a user might discard a first SIM card for wireless terminal 101 and replace it with a second SIM card for the same wireless terminal, thus changing the terminal's wireless identity within the wireless network. Of course, there are many innocent explanations too, such as a parent passing a wireless terminal to a child, or an entire family using a single pre-paid terminal, or a couple accidentally swapping look-alike terminals—all quite apart from trying to evade detection. In all these scenarios with disposable and pre-paid configurations, an investigator may be unable to put a name to a number.

Moreover, when investigating a crime, a terrorist attack, a missing persons case, a threat, and like situations, the cost of a false positive is high. A falsely identified suspect can be irreparably harmed by a false positive. Conversely, the true suspect or perpetrator remains at large. Therefore, investigators who face long lists of candidate suspects—especially candidate suspects whose identity is unknown—would benefit from automated took that can help minimize the incidence of false positives. Therefore, an approach that reduces the risk of fake positives would be useful and desirable.

SUMMARY OF THE INVENTION

When a person uses disposable wireless terminals or disposable SIM cards to avoid detection or surveillance, it would be useful to define behavior-based "fingerprints" that identify the user according to the pattern of behavior gleaned from the use of the wireless terminal, even when the user's identity is unknown. Likewise, a user might acquire another person's wireless terminal, perhaps to avoid detection. Can the investigator find someone thought to be lost, hiding, or evading detection by recognizing an actor based on wireless behavior?

The present inventors recognized that investigating people according to calls they originated and received presupposes that the investigator can identify the suspect from the telephone number, i.e., the investigator can decisively put a name to a number. The present inventors recognized that data that are available from telecommunications-events records can be exploited to glean patterns of behavior that act as identifying fingerprints in an investigation. Telecommunications-events records according to the illustrative embodiment are not merely traditional call-detail records reporting on calls made and received; rather, the illustrative telecommunications-event records additionally comprise location data corresponding to the reported-on telecommunications events that is of finer resolution than the traditional cell ID or Enhanced Cell ID in prior-art CDRs. Also, the reported-on telecommunications events may be non-call-related or non-text-related. Other relevant records that are not specifically reporting on telecommunications events also are optionally used.

The illustrative embodiment is a "behavior analysis system" that analyzes telecommunications-event records and other relevant records to infer whether a user's wireless behavior over the course of time is substantially similar or even identical to the wireless behavior of a known actor. The illustrative embodiment is further able to recognize that two users have substantially similar or identical wireless behaviors over time, even when neither user is a previously known actor or person of interest. A pattern of behavior typically comprises call-related and location attributes over a relatively extended operational period of time, e.g., weeks, months, years. Accordingly, the illustrative embodiment infers an identity or a substantial similarity as between two seemingly distinct users of wireless terminals, based on:

(i) how precisely a candidate's pattern of behavior matches a pre-defined or known pattern of behavior, and/or (ii) how precisely a candidate's pattern of behavior matches another candidate's pattern of behavior.

Based on one or more measures of preciseness, the illustrative embodiment infers that the user of a first wireless terminal is substantially similar to, or even identical to, a user corresponding to the second pattern of behavior, which might be the pre-defined pattern or the pattern of a second candidate terminal. The inference arises from the theory that, from a wireless telecommunications perspective, certain suspects behave in a characteristic manner over the course of time. For example, a suspect calls a certain limited set of numbers, or participates in a regularly scheduled conference call with certain known suspects, or makes and receives calls only from certain locations where the suspect cannot be overheard, etc.

Different investigations give rise to different considerations. In a first example, the investigator might be aware of certain behavioral attributes that are useful in identifying, ranking, and investigating possible candidates, such as identifying users who make/receive only very short calls or users who only use the wireless terminal during certain hours, etc. In this example, the candidate wireless terminals would be identified based on how precisely they satisfy the behavioral attribute(s) of interest in the investigation.

In a second example, the investigator might have a pre-defined pattern of behavior of a known actor who used a certain wireless terminal for a time, but the wireless terminal no longer appears to be in use; the investigator wants to apply the pre-defined pattern of behavior to identify other candidates with an identical or substantially similar pattern of behavior. In this second example, the candidate wireless terminals would be identified based on how precisely each candidate's pattern of behavior matches the pre-defined pattern of behavior. Ideally, this method would help the investigator recognize an unknown actor based on the person's pattern of behavior. Conversely, a wireless terminal that has been dormant for a long time goes into service again and the investigator wants to know whether the current user is likely to be the same person as the pre-dormancy user.

In a third example, the investigator does not have a pre-defined pattern of behavior to work from. In this third example, the candidate wireless terminals would be analyzed based on how precisely each candidate's pattern of behavior matches another candidate's pattern of behavior. Ideally, this process could identify a previously unknown actor who uses a plurality of different wireless terminals and/or SIM cards.

In a fourth example, the investigator realizes that two people have swapped terminals. Thus, a first pattern of behavior originally associated with a first wireless terminal would be recognized as the pattern of behavior of a second wireless terminal, and vice-versa as to a second pattern of behavior originally associated with the second wireless terminal.

Of course, any combination of these exemplary considerations can be applied within the scope of the present invention.

When a candidate wireless terminal is recognized as a previously-known suspect, or is newly identified as a suspect, the illustrative system transmits the gleaned information to other systems, to a data store, or to a display. Further, the system also transmits a request for a real-time location estimate for the suspect wireless terminal, which enables the investigator to begin tracking or surveilling the suspect.

Notably, the term "behavior" is contrasted herein to the term "usage," which indicates how a wireless terminal is used, e.g., what numbers it dials, what calls it receives, activations, deactivations, features used, etc. In contrast, "behavior" comprises more than usage, including one or more locations of the wireless terminal and therefore movement, which tends to correlate more closely with the behavior of the wireless terminal's user beyond the mere operation of the wireless terminal.

An illustrative system comprises:
a processor for:
generating a first pattern of behavior of a first wireless terminal, wherein the first pattern of behavior is based on a first plurality of records that report on events associated with the first wireless terminal, and wherein some of the events are telecommunications events experienced by the first wireless terminal,
measuring how precisely the first pattern of behavior of the first wireless terminal matches a second pattern of behavior, and based on the measured preciseness, inferring that a first user of the first wireless terminal is substantially similar to a second user corresponding to the second pattern of behavior; and
a transmitter for transmitting at least one of:
(i) an indication of the inferred substantial similarity between the first user and the second user, and
(ii) a request for a location estimate of the first wireless terminal.

An illustrative method comprises:
generating, by a data-processing system, a first pattern of behavior of a first wireless terminal, wherein the first pattern of behavior is based on a first plurality of records that report on events associated with the first wireless terminal, and wherein some of the events are telecommunications events experienced by the first wireless terminal;
measuring, by the data-processing system, how precisely the first pattern of behavior of the first wireless terminal matches a second pattern of behavior;
inferring by the data-processing system, based on the measured preciseness, that a first user of the first wireless terminal is substantially similar to a second user corresponding to the second pattern of behavior; and
transmitting, by the data-processing system, at least one of:
(i) an indication of the inferred substantial similarity between the first user and the second user, and
(ii) a request for a location estimate of the first wireless terminal.

BRIEF DESCRIPTION OF THE DRAWINGS

FIG. 7 depicts a flowchart of the salient sub-operations of operation 409 performed in accordance with the illustrative embodiment.

DETAILED DESCRIPTION

Figure 1:
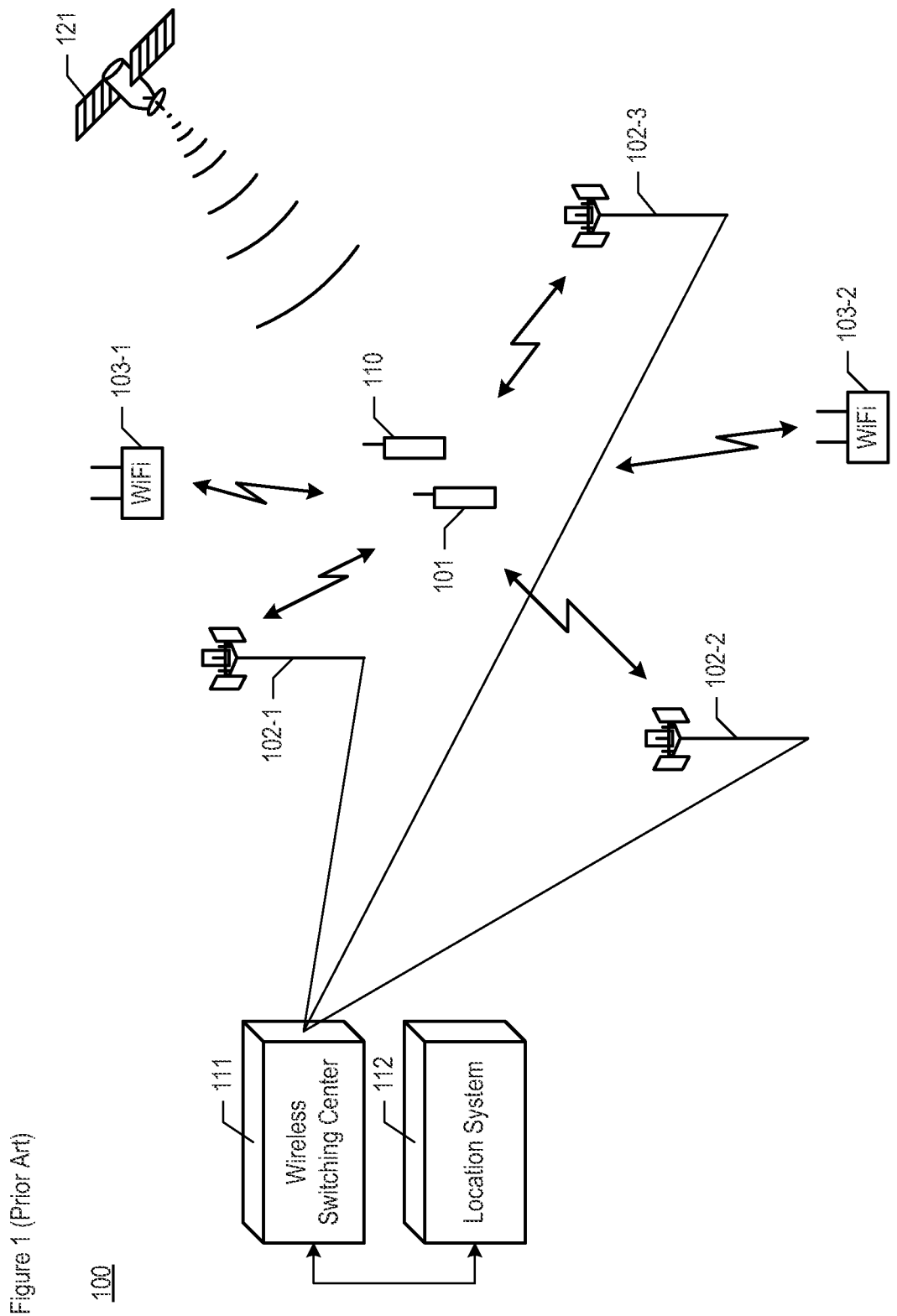
FIG. 1 depicts a diagram of the salient components of wireless telecommunications network 100 in accordance with the prior art.

For the purposes of this specification, the following terms and their inflected forms are defined as follows:
The term "behavioral attribute" is defined as a measurable factor that defines the behavior of one or more users of wireless terminals, such as the number of calls originated by a wireless terminal in a week, the countries of origin calling the wireless terminal, the number of text messages transmitted by the wireless terminal in a day, etc. Other examples of behavioral attributes are provided elsewhere herein.

The term "behavioral pattern" or "pattern of behavior" is defined as a composite of attributes of a wireless terminal, including at least one behavioral attribute. In addition to one or more behavioral attributes, a behavioral pattern may also comprise other attributes, such as the type of wireless terminal or the kind of calling plan subscription of the wireless terminal. A behavioral pattern typically reflects attribute data that was gathered over a relatively extended operational period of time, e.g., weeks, months, years, etc., but is not so limited. Examples of patterns of behavior are provided elsewhere herein.

The term "location" is defined as any one of a zero-dimensional point, a one-dimensional line, a two-dimensional area, or a three-dimensional volume. Thus, a location can be described, for example, by a street address, geographic coordinates, a perimeter, a cell ID, or an enhanced cell ID.

The term "telecommunications event" is defined as any occurrence involving electronic communications over a distance between a (wired or wireless) terminal and another entity in the context of the serving network (such as a base station controller, a switching center, an antenna, another terminal, etc.)—whether the involved telecommunications are wireless or wired (including electrical, optical, wire, and/or fiber) or a combination of wireless and wired. Typically, in the present context, a telecommunications event occurs between a wireless terminal and an element of wireless network 200. Examples of telecommunications events appear elsewhere herein.

The term "other events that are not telecommunications events" is defined as occurrences experienced by a wireless terminal, but which are not telecommunications-related events, such as conducting a financial transaction with a financial system. Records reporting on other events that are not telecommunications events, i.e., other-event records, are illustratively received by behavior analysis system 213 in operations 503 through 507. Examples of other events that are not telecommunications events are implicitly given in regard to the corresponding other-event records in regard to operations 503, 505, and 507.

The term "telecommunications-event record" is defined as a record that is generated as a result of a telecommunications event that is experienced by the reported-on wireless terminal. The telecommunications-event record comprises (i) information about the location of the wireless terminal when it experienced the reported-on telecommunications event, (ii) the IMSI of the wireless terminal or SIM card, and (iii) the telecommunications event that occurred. The reported-on telecommunications event is associated with the wireless terminal, whether the event is reported by the wireless terminal itself or by another element of the wireless network, e.g., a base station controller. The reported-on location information is preferably of a finer resolution than mere cell ID or enhanced cell ID. Examples of telecommunications-event records appear elsewhere herein.

The term "wireless terminal" is defined as an apparatus that:
(i) receives signals from another apparatus without a wire, or
(ii) transmits signals to another apparatus without a wire, or
(iii) both (I) and (ii).

This term is used synonymously herein with the following terms: wireless telecommunications terminal, user equipment, mobile terminal, and mobile unit.

Figure 2:
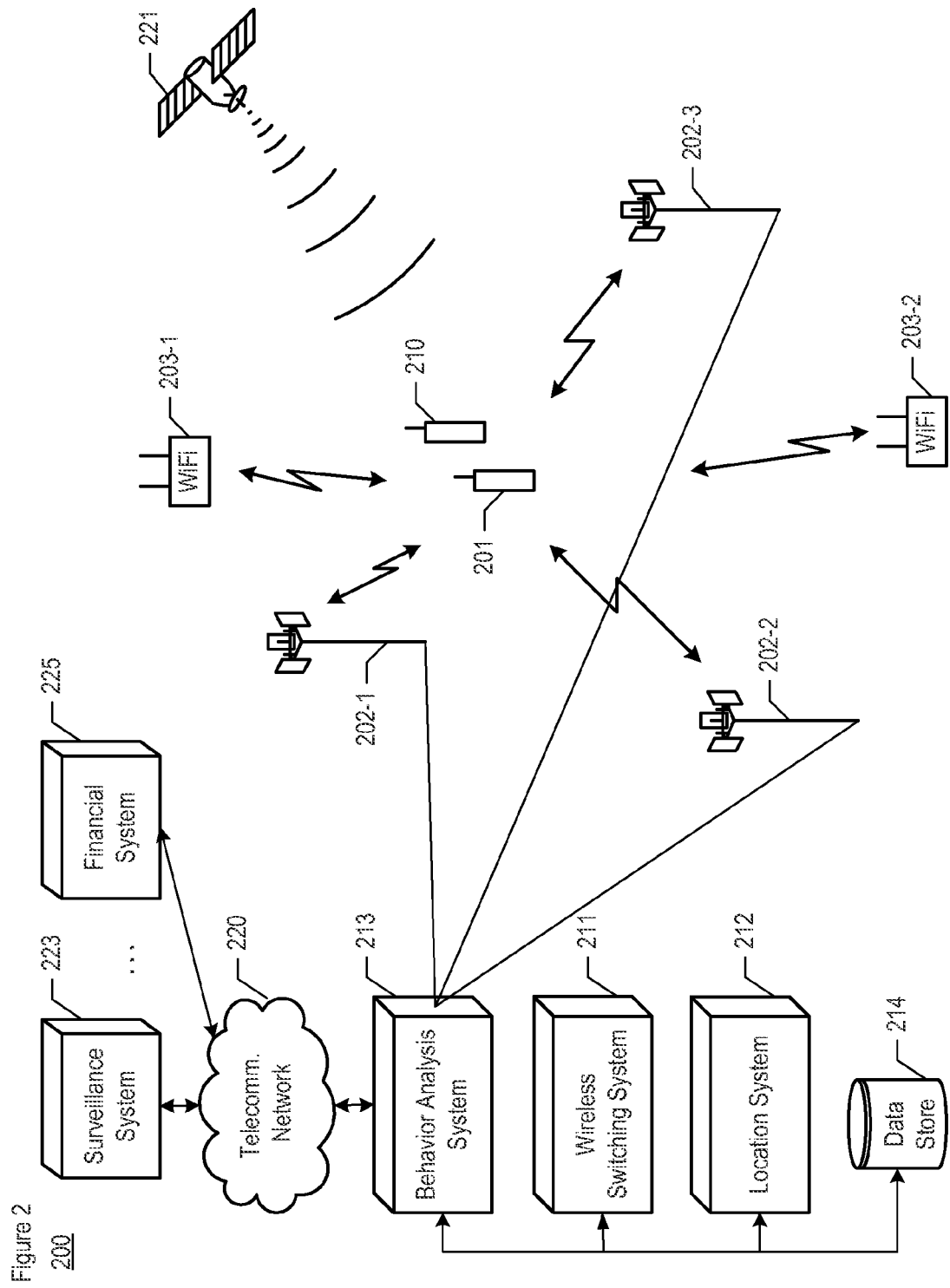
FIG. 2 depicts a diagram of the salient components of wireless telecommunications network 200 in accordance with the illustrative embodiment of the present invention.

FIG. 2 depicts a diagram of the salient components of wireless telecommunications network 200 in accordance with the illustrative embodiment: of the present invention. Wireless network 200 comprises wireless terminals 201 and 210, cellular base stations 202-1, 202-2, and 202-3, Wi-Fi base stations 203-1 and 203-2, wireless switching center 211, location system 212, behavior analysis system 213, and data store 214, which are interrelated as shown. Wireless network 200 provides wireless telecommunications service to all wireless terminals within its coverage area in well-known fashion; in addition, behavior analysis system 213 performs and coordinates the operations as described in more detail below. Global Positioning System ("GPS") constellation 221 is also depicted in FIG. 2, but is not part of wireless network 200. Likewise, telecommunications network 220, surveillance system 223, and financial system 225 are also depicted in FIG. 2, but are not part of wireless network 200. Other external systems also are connected to behavior analysis system 213 via telecommunications network 220 but are not depicted in FIG. 2, e.g., a facial recognition system, a GPS tracking system, a credit reporting system.

In accordance with the illustrative embodiment, wireless telecommunications service is provided to wireless terminals 201 and 210 (whether at the same time or at different times) in accordance with the air-interface standard of the 3rd Generation Partnership Project ("3GPP"). Examples of 3GPP air-interface standards include GSM, UMTS, and LTE. After reading this disclosure, however, it will be clear to those skilled in the art how to make and use alternative embodiments of the present invention that operate in accordance with one or more other air-interface standards (e.g., CDMA-2000, IS-136 TDMA, I5-95 CDMA, 3G Wideband CDMA, IEEE 802.11 Wi-Fi, 802.16 WiMax, Bluetooth, etc.) in one or more frequency bands.

Wireless terminals 201 and 210 each comprises the hardware and software necessary to be 3GPP-compliant and to perform the processes described below and in the accompanying figures, Wireless terminals 201 and 210 are mobile. For example and without limitation, wireless terminals 201 and 210 each is capable of:

measuring one or more traits of each of one of more electromagnetic signals (received from cellular base stations 202-1, 202-2, and 202-3 and Wi-Fi base stations 203-1 and 203-2) and of reporting the measurements to location engine 214, and transmitting one or more signals to cellular base stations 202-1, 202-2, and 202-3 and Wi-Fi base stations 203-1 and 203-2, including reports of telecommunications events experienced by wireless terminal 201, and receiving service from one or more of cellular base stations 202-1, 202-2, and 202-3 and Wi-Fi base stations 203-1 and 203-2.

Wireless terminals 201 and 210 are depicted as two separate and distinct terminals in the present figure. For simplicity, they are referred to herein as separate and distinct wireless terminals 201 and 210. However, it should be understood that these could be the same physical terminal operating with either the first SIM card ("wireless terminal 201") or with the second SIM card ("wireless terminal 210"). Therefore, it will be clear to those having ordinary skill in the art, after reading the present disclosure, how to make and use alternative embodiments in which there is only one physical terminal that operates with two separate and distinct SIM cards such that the physical terminal with a first SIM card has the identity of wireless terminal 201, and the physical terminal with a second SIM card has the identity of wireless terminal 210.

Examples of telecommunications events that are experienced and reported by wireless terminals 201 and 210 include without limitation:
  a. an origination of a voice call by the wireless terminal,
  b. a receiving of a voice call by the wireless terminal,
  c. an establishment of a voice call between the wireless terminal in the wireless network and another telecommunications terminal, whether in the network or elsewhere, i.e., establishing a call connection,
  d. an origination of a Short Message Service ("SMS") message by the wireless terminal,
  e. a receiving of an SMS message by the wireless terminal,
  f. an origination of a text message by the wireless terminal,
  g. a receiving of a text message by the wireless terminal,
  h. a location update request that is transmitted by the wireless terminal to an element of the network infrastructure, wherein the location update request is caused by at least one of the following occurrences:
    i. powering on the wireless terminal,
    ii. detecting by the wireless terminal that it is in a new location area, and
    iii. originating a data session by the wireless terminal,
    iv. a handover of the wireless terminal from one serving cell to another cell,
    v. an International Mobile Subscriber Identity ("IMSI") detach message that is transmitted by the wireless telecommunications terminal,
    vi. a powering off by the wireless telecommunications terminal,
    vii. an International Mobile Subscriber Identity ("IMSI") attach message that is transmitted by the wireless telecommunications terminal when it powers on, and
    viii. a powering on by the wireless telecommunications terminal,
  i. an origination by the wireless telecommunications terminal of an Unstructured Supplementary Service Data ("USSD") session,
  j. an origination of a data session by the wireless telecommunications terminal,
  k. an ending of a data session by the wireless telecommunications terminal,
  l. an activation, for the wireless telecommunications terminal, of a packet data protocol ("PDP") context by a GPRS Support Node in the wireless network,
  m. a deactivation, for the wireless telecommunications terminal, of a packet data protocol ("PDP") context by a GPRS Support Node in the wireless network,
  n. the wireless telecommunications terminal attaching to a packet radio data network in the wireless network, and
  o. the wireless telecommunications terminal detaching from the packet radio data network in the wireless network.

Telecommunications-event records are generated (as described below) that report on the above-listed telecommunications events. It will be clear to those having ordinary skill in the art how to recognize and implement the corresponding terms, if any, for non-3GPP types of wireless networks.

Wireless terminals 201 and 210 each is illustratively a smartphone with both voice and data service provided and supported by wireless network 200 (whether both terminals are active at the same time or at different times). It will be clear to those having ordinary skill in the art, after reading the present disclosure, how to make and use wireless network 200 with wireless terminal 201 that is a cell phone, a data tablet, or a combination thereof. It will be clear to those having ordinary skill in the art, after reading the present disclosure, how to make and use wireless network 200 with wireless terminal 210 that is a cell phone, a data tablet, or a combination thereof. Wireless terminals 201 and 210 are in service at the same time, but need not be in service during the same period of time. It will be clear to those skilled in the art, after reading this disclosure, how to make and use alternative embodiments of the present invention that comprise any number of wireless terminals supported by wireless network 200.

Cellular base stations 202-1, 202-2, and 202-3 communicate with wireless switching center 211 and with wireless terminals 201 and 210 via radio frequencies ("RF") in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

Cellular base stations 202-1, 202-2, and 202-3 comprise the hardware and software necessary to be 3GPP-compliant and to perform the processes described below and in the accompanying figures. For example and without limitation, cellular base stations 202-1, 202-2, and 202-3 are capable of:
  measuring one or more traits of each of one of more electromagnetic signals (transmitted by wireless terminal 201 and wireless terminal 210), and reporting the measurements to location system 212,
  detecting one or more of the telecommunications events occurring at wireless terminal 201 and wireless terminal 210, and
  transmitting one or more signals, and reporting the transmission parameters of those signals, and reporting telecommunications events to location system 212.

Wi-Fi base stations 203-1 and 203-2 communicate with wireless terminals 201 and 210 via radio frequencies ("RF") in well-known fashion (whether at the same time or at different times). Wi-Fi base stations 203-1 and 203-2 have a shorter range than cellular base stations 202-1, 202-2, and 202-3, but sometimes have a higher bandwidth. Wi-Fi base stations 203-1 and 203-2 are capable of, without limitation:
  measuring one or more traits of each of one of more electromagnetic signals (transmitted by wireless terminal 201 and wireless terminal 210), and reporting the measurements to location system 212, and
  detecting one or more of the telecommunications events occurring at wireless terminal 201 and wireless terminal 210, and
  transmitting one or more signals, and reporting the transmission parameters of those signals, and reporting telecommunications events to location system 212.

It will be clear to those having ordinary skill in the art how to make and use alternative embodiments comprising base stations (cellular, WiFi, etc.) and/or access points that are not capable of reporting transmission parameters and/or measurements to a location system; in such configurations, it will be clear to those having ordinary skill in the art how to use probes to monitor the respective interface between the base station and/or access point and other network entities to gather measurement and event information from/about the wireless terminals and transmit the gathered information to the location system such as illustrative location system 212.

Wireless switching center 211 comprises a switch that orchestrates the provisioning of telecommunications service to wireless terminals 201 and 210 and the flow of information to and from location system 212, and behavior analysis system 213, and data store 214, as described below and in the accompanying figures. Wireless switching center 211 collects data from throughout wireless network 200, and generates telecommunications-event records according to the telecommunications events that are listed above, without limitation. Illustratively, wireless switching center 211 collects location data from location system 212, from the base stations, and from wireless terminals 201 and 210. Each telecommunications-event record associates the reported-on telecommunications event with a location datum. The location datum indicates a location at which the reported-on telecommunications event is estimated to have occurred. As previously noted, the resolution of the estimated location varies. Wireless switching center 211 transmits the telecommunications-event records to behavior analysis system 213 and to data store 214.

As is well known to those skilled in the art, wireless switching centers are also commonly referred to by other names such as mobile switching centers, mobile telephone switching offices, routers, packet data service nodes, CPRS support nodes, etc.

Although the illustrative embodiment comprises one wireless switching center, it will be clear to those skilled in the art, after reading this disclosure, how to make and use alternative embodiments of the present invention that comprise any number of wireless switching centers. In accordance with the illustrative embodiment, all of the base stations servicing wireless terminals 201 and 210 are associated with wireless switching center 211. It will be clear to those skilled in the art, after reading this disclosure, how to make and use alternative embodiments of the present invention in which any number of base stations are associated with any number of wireless switching centers. It will be further clear to those having ordinary skill in the art, after reading this disclosure, how to make alternative embodiments wherein wireless switching center 211 is not the entity that generates the telecommunications-event records, and instead location system 212 generates these records based on data gathered from probes; or a combination of center 211-generated and system 212-generated records.

Location system 212 comprises hardware and software that estimates one or more locations for wireless terminals 201 and 210. According to the illustrative embodiment, location system 212 is the OmniLocate wireless location platform product from Polaris Wireless, Inc. OmniLocate estimates a location that is associated with telecommunications events, including events other than call origination and termination—events such as location area updates for wireless terminals. Examples of telecommunications events that elicit a location estimate from illustrative location system 212 are given above in reference to wireless terminals 201 and 210. Thus, the OmniLocate platform enables wireless switching center 211 to generate and provide more granular telecommunications-event records than standard call-detail records, by transmitting more precise location information, e.g., a 10-meter by 10-meter area that is of a finer resolution than a cell ID or enhanced cell ID in the prior art. Also, the granularity of available data is improved by the fact that more telecommunications events are captured and reported in these telecommunications-event records than in prior-art call-detail records. It will be clear to those having ordinary skill in the art, after reading the present disclosure, how to make and use alternative embodiments of the present invention that operate with a location system 212 other than Polaris Wireless' OmniLocate product. It will be clear to those having ordinary skill in the art, after reading the present disclosure, how to make and use alternative embodiments that use prior-art call-detail records instead of or in combination with telecommunications-event records.

Behavior analysis system 213 (described in more detail in a subsequent figure) is a data-processing system that comprises hardware and software and that is responsible for performing the behavior analysis according to the illustrative embodiment of the present invention. Behavior analysis system 213, which is an element of wireless network 200, executes and coordinates the operations described herein in reference to method 400, including wherein behavior analysis system 213 communicates with external systems that are not part of wireless network 200. It will be clear to those having ordinary skill in the art, after reading the present disclosure, how to make and use alternative embodiments wherein behavior analysis system 213 communicates with elements of wireless network 200, but is not an element thereof.

Data store 214 is a digital data storage system that is responsible for receiving data, storing data, and retrieving data in a fashion that is well-known in the art. Illustratively, data store 214 is implemented as a hard disk drive that is part of wireless network 200. Illustratively, data store 214 receives the results of the analysis performed by behavior analysis system 213 and archives these results along with the various records and data received by behavior analysis system 213. It will be clear to those having ordinary skill in the art, after reading the present disclosure, how to make and use alternative embodiments wherein data store 214 communicates with elements of wireless network 200, but is not an element thereof.

Telecommunications network 220 is well known in the art and provides connectivity and telecommunications (voice and/or data) among the systems that connect to it, including behavior analysis system 213, surveillance system 223, financial system 225, and other systems that are external to wireless network 200 but are not shown in FIG. 2, e.g., a tracking system, a facial recognition system, a credit reporting system, etc.

Surveillance system 223 is well known in the art and telecommunicates with behavior analysis system 213 (illustratively via telecommunications network 220) to transmit surveillance records to behavior analysis system 213. For example, surveillance system 223 provides records indicating that wireless terminal 201 is at a location that is under surveillance by surveillance system 223.

Financial system 225 is well known in the art and is illustratively a banking system that telecommunicates with behavior analysis system 213 (illustratively via telecommunications network 220) to transmit financial records to behavior analysis system 213, including bank account transactions, credit card transactions, debit card transactions, deposits, debits, transfers of funds, and other records that associate a user and/or a wireless terminal with these transactions; the records also preferably comprise location data that indicates the location of the reported-on transactions, e.g., an ATM address, a shop address, an IP address, a location from where a wireless terminal initiated the transaction, etc. without limitation.

Global Positioning System ("GPS") constellation 221 is well known in the art and provides precise location data to GPS-enabled wireless terminals and to any GPS-enabled system on Earth.

As noted, other systems that are external to wireless network also are contemplated to telecommunicate with behavior analysis system 213, e.g., a GPS tracking system, a facial recognition system, a credit reporting system, etc.

It will be clear to those having ordinary skill in the art, after reading the present disclosure, how to make and use alternative embodiments wherein behavior analysis system 213 is incorporated into one of the other illustrated systems, e.g., location system 212, or wireless switching center 211, or surveillance system 223. It will be further clear to those having ordinary skill in the art, after reading the present disclosure, how to make and use alternative embodiments wherein behavior analysis system 213 further comprises one or more of the other illustrated systems, e.g., location system 212 and/or wireless switching center 211 and/or data store 214. It will be further clear to those having ordinary skill in the art, after reading the present disclosure, how to make and use alternative embodiments wherein behavior analysis system 213 telecommunicates directly with one or more external systems without the intervening services of telecommunications network 220.

Figure 3:
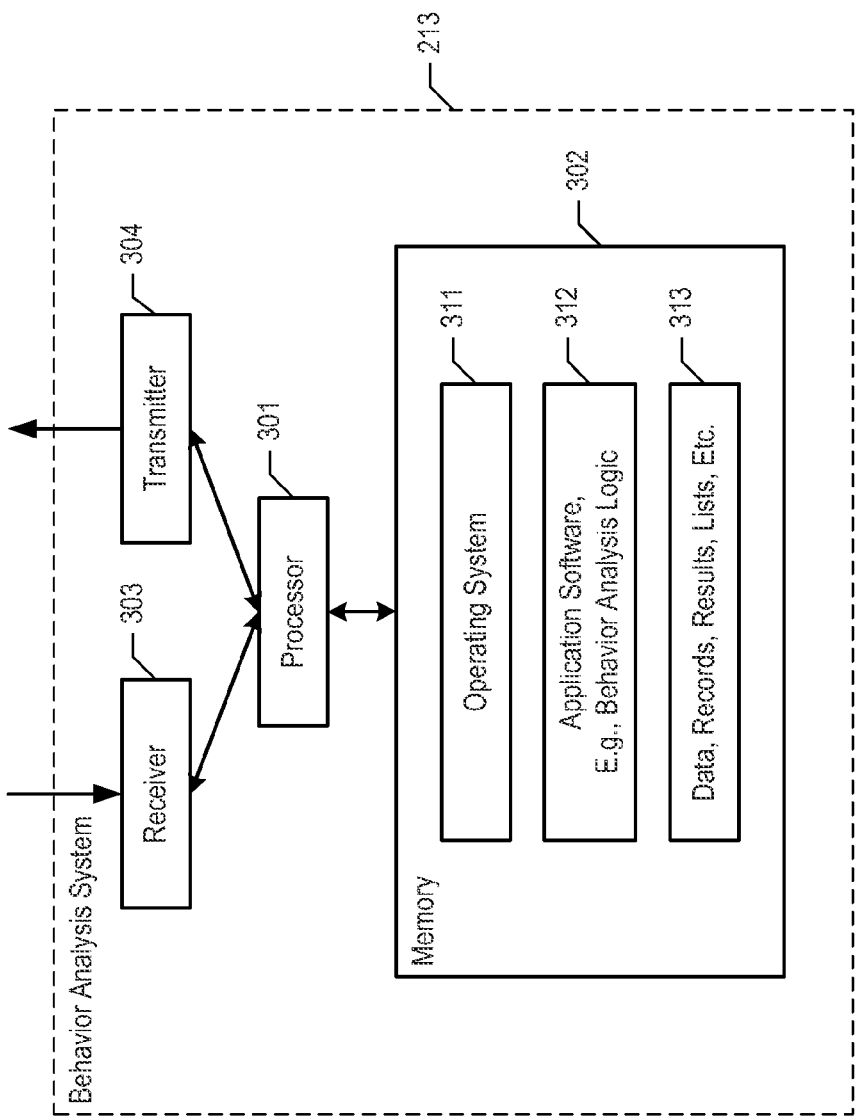
FIG. 3 depicts a block diagram of the salient components of behavior analysis system 213 in accordance with the illustrative embodiment.

FIG. 3 depicts a block diagram of the salient components of behavior analysis system 213 in accordance with the illustrative embodiment. Illustrative embodiment 213 is a data-processing system that comprises as part of its hardware platform: processor 301, memory 302, receiver 303, and transmitter 304.

Processor 301 is a processing device such as a microprocessor that, when operating in conjunction with the other components of illustrative embodiment 213, executes the software, processes the data, and telecommunicates according to the operations described herein. Processor 301 is well known in the art.

Memory 302 is non-transitory and non-volatile computer memory technology that stores operating system 311, application software 312, and element 313 which comprises data, records, results, lists, etc. Memory 302 is well known in the art. It will be clear to those having ordinary skill in the art how to make and use alternative embodiments that comprise more than one memory 302 or subdivided segments of memory 302.

Receiver 303 is a component that enables illustrative embodiment 213 to telecommunicate with other components internal and external to wireless network 200 by receiving electronic signals. For example, receiver 303 enables communication pathways from wireless switching center 211, location system 212, data store 214, etc. within wireless network 200, as well as to other systems that are external to wireless network 200, such as telecommunications network 220, a surveillance system, a tracking system, a financial system, another wireless network, etc. without limitation. Receiver 303 is well known in the art. It will be clear to those having ordinary skill in the art how to make and use alternative embodiments that comprise more than one receiver 303.

Transmitter 304 is a component that enables illustrative embodiment 213 to telecommunicate with other components internal and external to wireless network 200 by transmitting electronic signals. For example, transmitter 304 enables communication pathways to wireless switching center 211, location system 212, data store 214, etc. within wireless network 200, as well as to other systems that are external to wireless network 200, such as telecommunications network 220, a surveillance system, a tracking system, a financial system, another wireless network, etc, without limitation. Transmitter 304 is well known in the art. It will be clear to those having ordinary skill in the art how to make and use alternative embodiments that comprise more than one transmitter 304.

Figure 4:
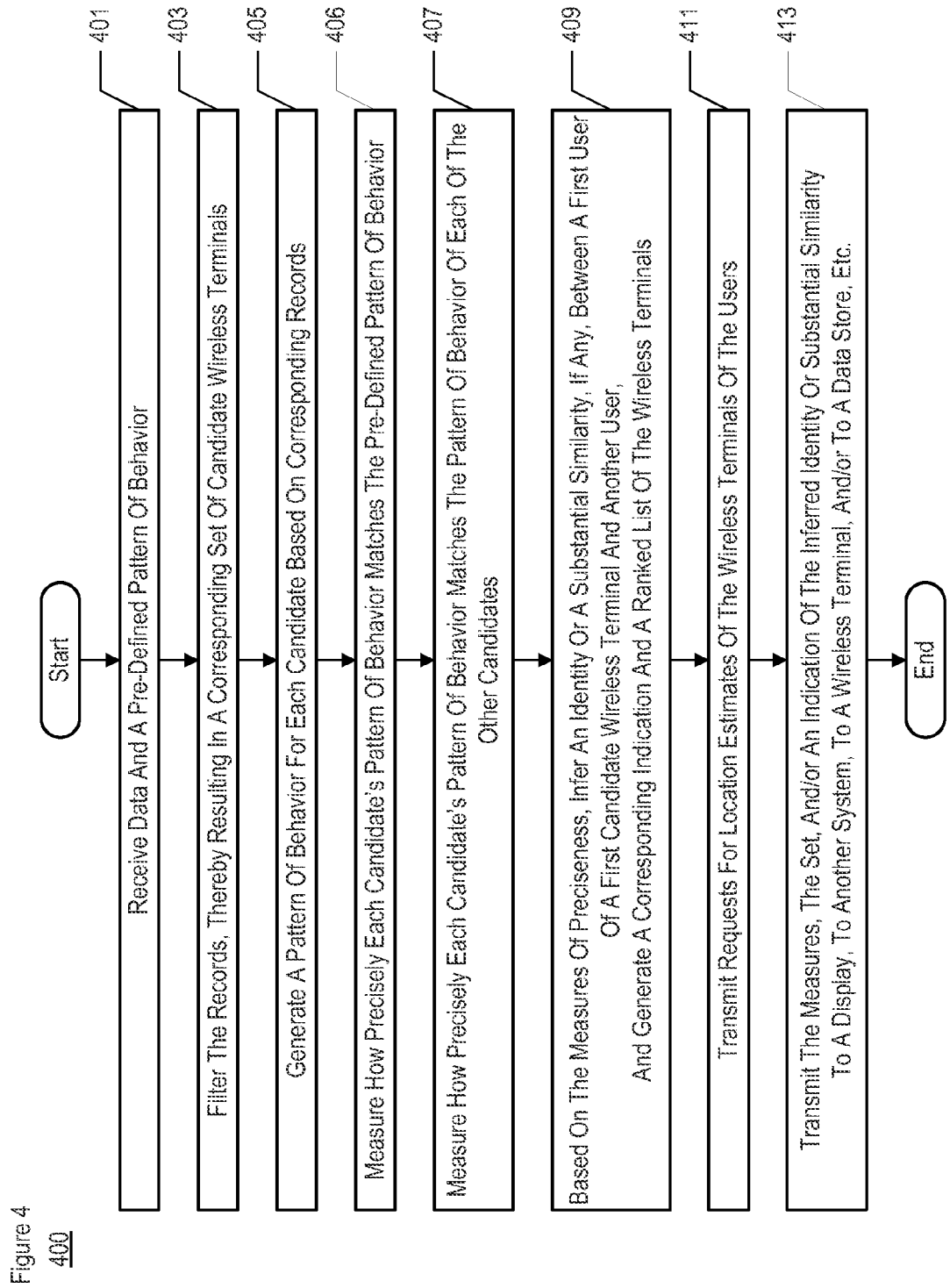
FIG. 4 depicts a flowchart of the salient operations of method 400 performed in accordance with the illustrative embodiment of the present invention.

The specialized application software 312 that is executed by processor 301 is illustratively denominated the "behavior analysis logic" that enables behavior analysis system 213 to perform the operations of method 400 in FIG. 4. It will be clear to those skilled in the art, after reading the present disclosure, that in alternative embodiments the data-processing hardware platform of behavior analysis system 213 can be embodied as a multi-processor platform, as a server, as a sub-component of a larger computing platform, or in some other computing environment—all within the scope of the present invention. It will be clear to those skilled in the art, after reading the present disclosure, how to make and use the data-processing hardware platform for behavior analysis system 213.

FIG. 4 depicts a flowchart of the salient operations of method 400 according to the illustrative embodiment of the present invention. Behavior analysis system 213 executes and coordinates the operations of method 400 in accordance with the illustrative behavior analysis logic.

At operation 401, behavior analysis system 213 receives a plurality of data and a pre-defined pattern of behavior. Operation 401 is described in more detail in a subsequent figure. It will be clear to those having ordinary skill in the art, after reading the present disclosure, how to make and use alternative embodiments wherein no pre-defined pattern of behavior is received, e.g., wherein behavior analysis system 213 generates rather than receives this pattern of behavior, or, alternatively, wherein there is no pre-defined pattern of behavior to start with.

At operation 403, behavior analysis system 403 filters the records. In this operation, the illustrative embodiment analyzes the records it has received and synthesizes the data according to the set of wireless terminals that are associated with the records. This operation results in a corresponding set of candidate wireless terminals that are to be further evaluated according to the subsequent operations of method 400. Operation 403 is described in more detail in a subsequent figure.

At operation 405, for each candidate in the set of candidate wireless terminals, behavior analysis system 213 generates a pattern of behavior that is based on those records that are associated with the respective candidate and that have been collected over the operative period of time, e.g., six months, a year, etc. Depending on the particular implementation, only some of the records might be selected as the basis for generating the pattern of behavior. A pattern of behavior is preferably based at least in part on location data in the records used. However, patterns of behavior according to the illustrative embodiment need not have a location component. Illustratively, the pattern of behavior is generated from analyzing a plurality of records for each candidate, the records comprising one or more of the following without limitation:

records that report on telecommunications events—as received in operation 501,
    records that report on other events that are not telecommunications events—as received at operation 503,
    tracking records—as received in operation 505,
    activation records—as received in operation 507, and
    deactivation records—as received in operation 507.

In addition to the records, geographic information—as received in operation 509—is also available for analyzing a candidate's records. For example, location data in the records can be correlated or refined according to the geographic information to determine whether, for example, a location is known to be outdoors, e.g., a park, a lake, a street; or indoors, e.g., within the footprint of a high-rise building or a warehouse.

Illustrative examples of patterns of behavior covering a period of time, e.g., a year, for a given wireless terminal include one or more of the following, alone or in combination with each other, without limitation:

the set of numbers called by the wireless terminal,
the set of numbers calling the wireless terminal,
the set of numbers from which the wireless terminal receives text messages,
the set of numbers to which the wireless terminal transmits text messages,
the set of locations at which the wireless terminals receives and/or originates calls, and any known characteristics of those locations, e.g., calls are originated only from a park that is outdoors,
the multi-party conference calls in which the wireless terminal participates,
the mufti-party conference calls in which the wireless terminal participates that include certain other parties of interest,
the set of calls originated and received by the wireless terminal that occur within a certain timeframe, e.g., weekly between 10 a.m. and 1 p.m.,
the average duration of the calls originated/received by the wireless terminal and/or other corresponding statistical parameters of the duration, e.g., maximum, standard deviation, etc.,
the time period during which the wireless terminal originates and/or receives calls, e.g., only between 4 a.m. and 7 a.m,
the types of calls, e.g., only international calls to/from a certain set of countries,
the total number of originating calls and/or texts and/or emails per unit time, e.g., per day,
the total number of terminating calls and/or texts and/or emails per unit time, e.g., per day,
the range of geographical latitude and/or longitude traversed by the wireless terminal per unit time, e.g., per day,
the number of wireless network cells visited per unit time, e.g., per day, and a statistical measure of calls, texts, and/or emails per time period, e.g., the weekly maximum, the average, the standard deviation, etc.

The variety, granularity, periodicity, combinations, and complexity of the patterns of behavior will vary based on the behavioral attributes surrounding the respective investigation. Also, the operative period of time that is the basis for the pattern of behavior also will vary, e.g., a month, a year. The behavioral attributes to be considered in generating a pattern of behavior for the candidate wireless terminals will vary from investigation to investigation. Illustrative examples of behavioral attributes are given in regard to operation 511.

According to the illustrative embodiment, after the proper and relevant attributes (e.g., behavioral attributes and other attributes), operational period of time, characteristics, and considerations are defined for an investigation, behavior analysis system 213 uses machine learning techniques that are well known in the art to generate the pattern of behavior for each of the candidate wireless terminals over the operational period of time. It will be clear to those having ordinary skill in the art, after reading the present disclosure, how to make and use alternative embodiments wherein other techniques generate the pattern of behavior, or wherein a combination of machine learning and other techniques are used.

At operation 406, behavior analysis system 213 measures how precisely each candidate's pattern of behavior matches the pre-defined pattern of behavior. The behavior analysis logic in behavior analysis system 213 compares one pattern of behavior to another and evaluates a proper measure of preciseness between them. The measure depends on the nature of the behavioral attributes in the patterns of behavior being compared. Some measures are quantitative and some are qualitative. Illustratively, the pre-defined pattern of behavior comprises:
20 calls originated per day on average, each call having a duration of maximum 30 seconds,
2 calls received per day on average, each originating overseas, and
a range of 50-80 text messages received per day that originate overseas.

Illustratively, the pattern of behavior of the candidate wireless terminal comprises:
25 calls originated per day on average, each call having a duration of maximum 30 seconds,
1-2 calls received per day on average, each originating overseas, and
a range of 60-70 text messages received per day that originate overseas.

Accordingly, a first illustrative measure of preciseness according to the present operation comprises a comparison of the corresponding behavioral attributes:
25 calls versus 20 calls in the pre-defined pattern is considered a match by the behavior analysis logic,
1-2 calls versus 2 calls in the pre-defined pattern is considered a match by the behavior analysis logic, and
60-70 versus 50-80 overseas-originated texts in the pre-defined pattern is considered a match by the behavior analysis logic, and
an overall preciseness score results in a 3-out-of-3 match, as determined by the behavior analysis logic.

Illustratively then, the measure of preciseness is the 3-out-of-3 match.

A second illustrative measure of preciseness according to the present operation has no overall score but evaluates the behavioral attributes one by one, resulting in a composite measure of preciseness:
25 calls versus 20 calls in the pre-defined pattern is off by 25% and is not considered a match by the behavior analysis logic,
1-2 calls versus 2 calls in the pre-defined pattern is considered a 100% match by the behavior analysis logic, and
60-70 versus 50-80 overseas-originated texts in the pre-defined pattern is considered a 100% match by the behavior analysis logic.

Illustratively then, the measure of preciseness is the composite set of {no-match, 100%-match, and 100%-match} as evaluated above, These simple illustrative examples are presented for clarity. As noted, a proper measure of preciseness depends closely on the nature of the relevant behavioral attributes and is specific to the details of the investigation and the data that are available to the behavior analysis system. For example, the investigator might have intelligence that a known terrorist receives calls from a certain foreign country every day, and therefore someone who does not satisfy a daily criterion is not considered a proper match or is ranked in a lower in priority in the investigation. It is therefore left to the discretion of the implementers to define a measure of preciseness that is suitable to the needs of the investigation at hand.

At operation 407, behavior analysis system 213 measures how precisely each candidate's pattern of behavior matches the pattern of behavior of each of the other candidate wireless terminal in a manner analogous to operation 406 as described above. Thus, in the present operation, the behavior analysis logic in behavior analysis system 213 measures how precisely a first pattern of behavior of a first candidate wireless terminal matches a second pattern of behavior of a second candidate wireless terminal. As explained above, a proper measure of preciseness depends closely on the nature of the relevant behavioral attributes and is specific to the details of the investigation and the data that are available to the behavior analysis system. It is therefore left to the discretion of the implementers to define a measure of preciseness that is suitable to the needs of the investigation at hand.

Notably, in regard to operations 406 and 407, candidate wireless terminals are evaluated based on a pattern of behavior generated from records covering a relatively extended operational period of time in the past, e.g., a month, six months, a year, etc. Therefore, the present analysis is by definition an "after-the-fact" approach that is distinguishable from real-time fraud-detection and anti-spoofing techniques generally known in the art. One typical prior-art technique evaluates a call origination from a given mobile phone by comparing some parameters of the originating call attempt, e.g., the dialed number and/or the time of day, with an existing calling profile for the mobile; the technique determines in real-time whether the originating call fits the existing calling profile and either allows the originating call to proceed or blocks the call. This prior-art technique evaluates a call attempt against a profile. In contrast, the present analysis is not concerned with incipient calls and is not a call-control technique. To the contrary, the illustrative embodiment looks back over time, using records of long-past calls (and other records). Moreover, the illustrative embodiment is independent of whether the past calls were legitimate or fraudulent, authorized to proceed or blocked.

At operation 409—which is described in more detail in a subsequent figure—based on the preceding measures of preciseness, behavior analysis system 213 infers an identity or a substantial similarity, if any, as between a first user of a first candidate wireless terminal and another (second) user and generates a corresponding indication of the inference. For example, the other (second) user could be the user corresponding to the pre-defined pattern of behavior from operation 401/511; the other (second) user could alternatively be the user of a second candidate wireless terminal; or the other (second) user could be the user of the pre-defined pattern and also the user of a second candidate wireless terminal. Illustratively, the first user is the user of wireless terminal 201 and the second user is the user of wireless terminal 210.

It will be clear to those having ordinary skill in the art, after reading the present disclosure, that behavior analysis system 213 is capable of inferring that more than two users are identical. For example, a user might employ a dozen different SIM cards, but after behavior analysis system 213 executes the foregoing operations of method 400, it properly infers that twelve users have a substantial similarity that is sufficient to infer that the twelve are identical, i.e., one and the same person.

It will be further clear to those having ordinary skill in the art, after reading the present disclosure, that behavior analysis system 213 is capable of inferring that more than two users have substantially similar patterns of behavior, but are not necessarily identical to each other. For example, a user might employ a dozen different SIM cards, but after behavior analysis system 213 executes the foregoing operations of method 400, it infers that ten users are one and the same person and that two more users are substantially similar to the ten. This inference might result from insufficiently conclusive data as to the two "substantially similar" wireless terminals, or from a more diverse or inconsistent behavior of the latter two as compared to the former ten. It will be further clear to those having ordinary skill in the art, after reading the present disclosure, that behavior analysis system 213 is capable of inferring various degrees or a continuum of degrees of similarity as between users.

Thus, in the present operation, behavior analysis system 213, based on the measure(s) of preciseness, infers a substantial similarity (if any) between a first user of a first candidate wireless terminal and a second user who corresponds to the second pattern of behavior. The second pattern of behavior might be the pre-defined pattern of behavior, or might be a pattern of behavior generated by behavior analysis system 213 for a second candidate wireless terminal. The substantial similarity might be sufficient to infer an identity between the first user and the second user. It is left to the implementers of behavior analysis system 213 to define when a substantial similarity is sufficient to infer an identity.

At operation 411, behavior analysis system 213 transmits one or more requests for location estimates of the wireless terminals of the above-mentioned first user and second user. When the pre-defined pattern of behavior is not associated with a known wireless terminal, i.e., the pattern might be based on attributes that are relevant in an investigation but there is no pre-identified wireless terminal, there is no second wireless terminal for which a request for a location estimate can be generated and transmitted. In such a case, behavior analysis system 213 has properly found the candidate(s) that is/are substantially similar and even identical to the (second) user belonging to the pre-defined pattern of behavior, which is valuable information for the investigation even when no particular wireless terminal was pre-identified for that (second) user. On the other hand, when behavior analysis system 213 identifies two or more candidates as being identical or substantially similar to each other, system 213 transmits requests for the respective locations of the plurality of identified candidate wireless terminals.

Behavior analysis system 213 illustratively transmits each location request to location system 212. It will be clear to those having ordinary skill in the art, after reading the present disclosure, how to make and use alternative embodiments wherein the request is transmitted to another element of wireless network 200, e.g., wireless switching center 211, or to another system that is external to wireless network 200. The location request, and the respective location estimate that is received by behavior analysis system 213 in response, enable an investigator to begin tracking or surveilling the suspect wireless terminal.

At operation 413, behavior analysis system 213 transmits the measures of preciseness, the sets of candidates, and/or an indication of the inferred identity or substantial similarity to a display, to another system, to a wireless terminal, and/or to a data store, etc. Illustratively, behavior analysis system 213 transmits the measures of preciseness computed in operations 406 and 407 and the outcome of operation 409 to a display that is attached to behavior analysis system 213, to another wireless terminal in network 200, to an external surveillance system operated by law enforcement authorities, and also to data store 214. Behavior analysis system 213 also archives the records and other data that formed the basis for operations 401 through 409 to data store 214.

It will be clear to those skilled in the art, after reading the present disclosure, how to make and use alternative embodiments of method 400 wherein the operations are differently sequenced, grouped, or sub-divided—all within the scope of the present invention. It will be further clear to those skilled in the art, after reading the present disclosure, how to make and use alternative embodiments of method 400 wherein some of the recited operations are omitted or are executed by other elements of wireless network 200 and/or by systems that are external to wireless network 200.

Figure 5:
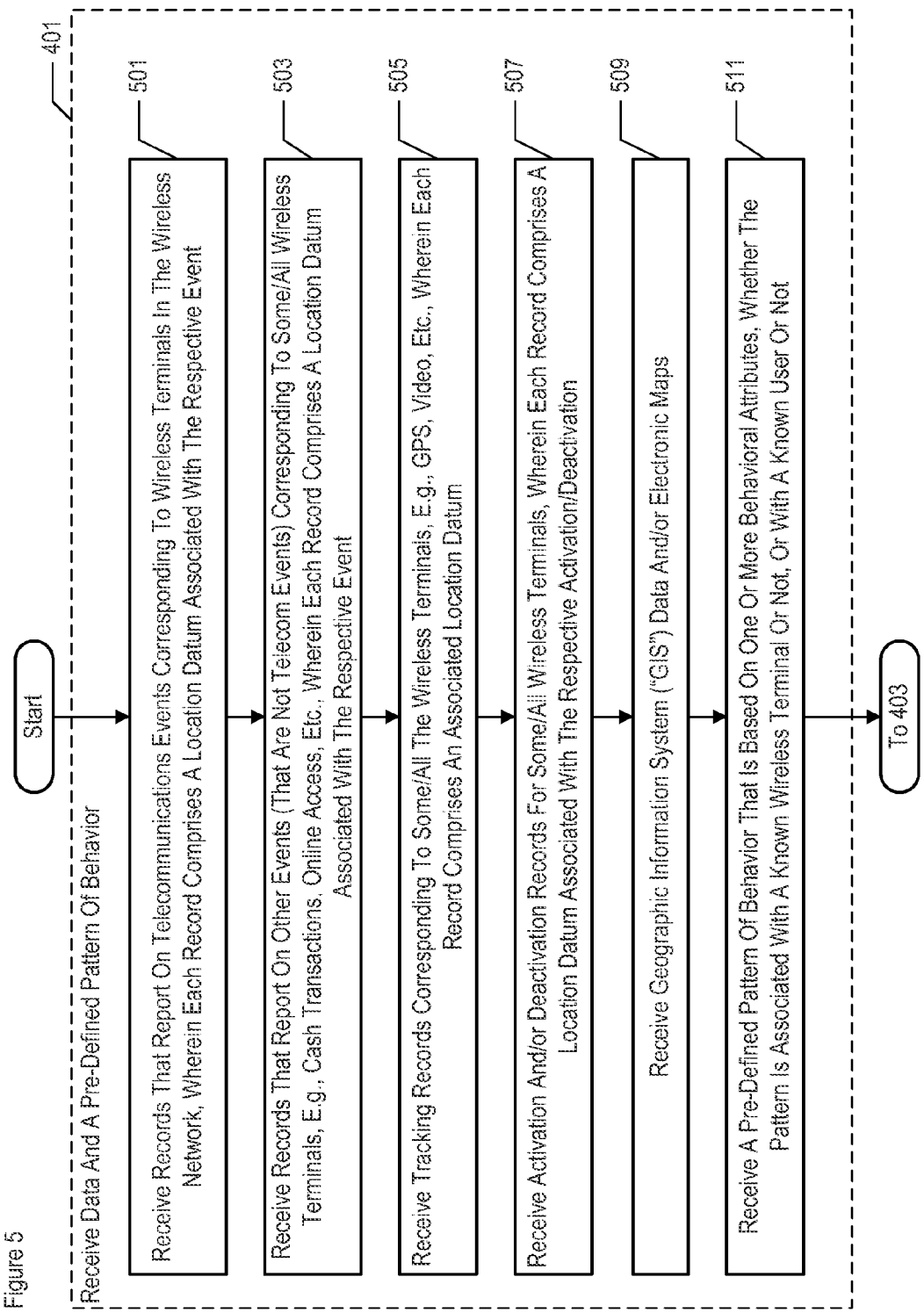
FIG. 5 depicts a flowchart of the salient sub-operations of operation 401 performed in accordance with the illustrative embodiment.

FIG. 5 depicts a flowchart: of the salient sub-operations of operation 401 performed in accordance with the illustrative embodiment.

At operation 501, behavior analysis system 213 receives records that report on telecommunications events corresponding to wireless terminals in wireless network 200, wherein each telecommunications-event: record comprises a location datum associated with the respective telecommunications event. Illustrative examples of telecommunications-event records that report on telecommunications events that were experienced by a given wireless terminal include without limitation:

- a record wherein the wireless terminal received a call at a first location i.e., is the called party,
- a record wherein the wireless terminal originated a call at a second location $L_2$, i.e., is the calling party,
- a record wherein the wireless terminal executed a call transfer at a third location $L_3$,
- a record wherein the wireless terminal received a text message at a fourth location $L_4$, and
- a record wherein the wireless terminal originated a text message at a fifth location $L_5$.

As noted earlier, any number of other telecommunications events are recorded and reported on in corresponding telecommunications-event records that are associated with the given wireless terminal.

At operation 503, behavior analysis system 213 receives records that report on other events that are not telecommunications events that occurred at/from the wireless terminal, wherein each record preferably comprises a location datum associated with the respective event. Preferably these other-event records also comprise time data such as timestamps. Illustrative examples of other-event records that report on other events that are not telecommunications events but which events are associated with a wireless terminal include without limitation:

- a record wherein the wireless terminal was used to conduct a financial transaction at a sixth location $L_6$, e.g., a purchase, a refund, a deposit, a transfer of funds, a credit card transaction, a debit card transaction, etc.,
- a record at a seventh location $L_7$ wherein the wireless terminal accessed an online portal/destination that is of interest, e.g., a bank, a bank account, a credit card account, a debit card account, an Internet domain, a Universal Resource Locator ("URL"), etc.,
- a record at an eighth location $L_8$ wherein the wireless terminal received data from a source that is of interest, e.g., a bank, a financial institution, a person, or another entity, an IP address, an Internet domain, an Internet address, etc.
- a record at a ninth location $L_9$ wherein the wireless terminal transmitted data to a destination that is of interest, e.g., a bank, a financial institution, a person, another entity, an IP address, an Internet domain, an Internet address, etc.,
- a record at a tenth location $L_{10}$ wherein the wireless terminal activated a camera device that is part of the wireless terminal,
- a record at an eleventh location $L_{11}$ wherein the wireless terminal activated a video and/or audio-recording device that is part of the wireless terminal,
- a record at a thirteenth location $L_{12}$ wherein a surveillance system indicates that the wireless terminal is at the surveilled location $L_{12}$.

It will be clear to those having ordinary skill in the art, after reading the present disclosure, how to make and use alternative embodiments wherein these other-event records comprise no location datum; or wherein the other-event records comprise some records with a location datum and some other records with no location datum. It will be further clear to those having ordinary skill in the art, after reading the present disclosure, how to record and report on any number of other events, and further how to collect, construct, and/or receive any number of corresponding other-event records.

At operation 505, behavior analysis system 213 receives tracking records corresponding to at least some of the wireless terminals in wireless network 200, e.g., GPS records, video records, surveillance records, etc., wherein each record comprises an associated location datum. The events leading to these records are examples of other events that are not telecommunications events, and hence the records are other-event records. Preferably these tracking records also comprise time data such as timestamps.

At operation 507, behavior analysis system 213 receives activation records and deactivation records for at least some of the wireless terminals in wireless network 200, corresponding a wireless terminal being activated (i.e., an account being created) or deactivated (i.e., the subscriber account being terminated or turned off) in wireless network 200. Each record comprises a time datum such as a timestamp and preferably also comprises a location datum associated with the respective activation/deactivation. The events leading to these activation/deactivation records are examples of other events that are not telecommunications events, and hence the records are other-event records. It will be clear to those having ordinary skill in the art, after reading the present disclosure, how to make and use alternative embodiments wherein the activation and deactivation records comprise no location datum, or wherein some records comprise a location datum and some other records comprise no location datum.

At operation 509, behavior analysis system 213 receives data from a Geographic Information System ("GIS") that is well known in the art and/or from a similar source of electronic maps. The received data comprises electronic maps and information about the terrain covered by wireless network 200, for example indicating where there are water surfaces, parks, streets, buildings, etc.

At operation 511, behavior analysis system 213 receives a pre-defined pattern of behavior. The pattern of behavior is based on one or more behavioral attributes. Notably, the pre-defined pattern of behavior need not be associated with a known person or wireless terminal. When the pre-defined pattern of behavior is associated with a known person of interest who used a known wireless terminal, the pattern is based on that person's behavioral data and corresponding behavioral attributes. Alternatively, the investigator can define the behavioral attributes of the pre-defined pattern of behavior, such as countries of interest, or call durations of interest, etc.

Examples of behavioral attributes according to the illustrative embodiment include one or more of the following, alone or in combination, without limitation:

- a point in time,
- a period of time,
- a period of time encompassing call origination and/or call reception,
- a period of time for a financial transaction, e.g., a payment, a refund, a deposit, a transfer of funds, a credit card transaction, a debit card transaction, etc.,
- the telephone numbers called by the wireless terminal,
- the telephone numbers calling the wireless terminal,
- the telephone numbers from which the wireless terminal receives text messages, the telephone numbers to which the wireless terminal transmits text messages, location data associated with telecommunications events and preferably any known characteristics of those locations, e.g., an outdoors location in a park, location data associated with other events (that are not telecommunications events) and preferably any known characteristics of those locations, e.g., payments made via the wireless terminal only occur at a certain shop, statistical parameters of the other events (that are not telecommunications events), e.g., total number, average per unit time, maximum per unit time, etc., location and time associated with activations and/or deactivations of the wireless terminal, multi-party conference call(s) in which the wireless terminal participates, statistical parameters of the duration of calls originated/received, e.g., average, maximum, standard deviation, etc., type of calls, e.g., international calls, international calls to/from a country(ies), local calls, multi-party calls, the number of originating calls and/or texts and/or emails per unit time, e.g., per day, the number of terminating calls and/or texts and/or emails per unit time, e.g., per day, the range of geographical latitude and/or longitude of locations in a set of records, the number of wireless network cells visited, an online portal/destination that is of interest, e.g., a bank, a bank account, a credit card account, an Internet domain, a Universal Resource Locator ("URL"), etc., an online data source that is of interest, e.g., a bank, a financial institution, a person, or another entity, an IP address, an Internet domain, an Internet address, etc., an online destination that is of interest, e.g., a bank, a financial institution, a person, or another entity, an IP address, an Internet domain, an Internet address, etc.

Internet Protocol (IP) addresses of interest, an activation of a camera, an audio-recording device, or a video-recording device that is part of a wireless terminal, and/or a deactivation thereof, and a facial recognition of the user as determined from a surveilled location.

It will be clear to those having ordinary skill in the art, after reading the present disclosure, how to define and use other behavioral attributes upon which a pattern of behavior can be based—all within the scope of the present invention.

It will be clear to those having ordinary skill in the art, after reading the present disclosure, how to make and use alternative embodiments wherein, rather than receiving the pre-defined pattern of behavior, behavior analysis system 213 receives records associated with a person of interest—records of the kind described in operations 501 through 509—and further wherein behavior analysis system 213 generates the pre-defined pattern of behavior from these received records. It will be further clear to those having ordinary skill in the art, after reading the present disclosure, how to make and use alternative embodiments without operation 511, i.e., wherein there is no pre-defined pattern of behavior; in such embodiments, behavior analysis system 213 seeks to identify from among the set of candidate wireless terminals those candidates that have identical or substantially similar patterns of behavior as to each other.

Figure 6:
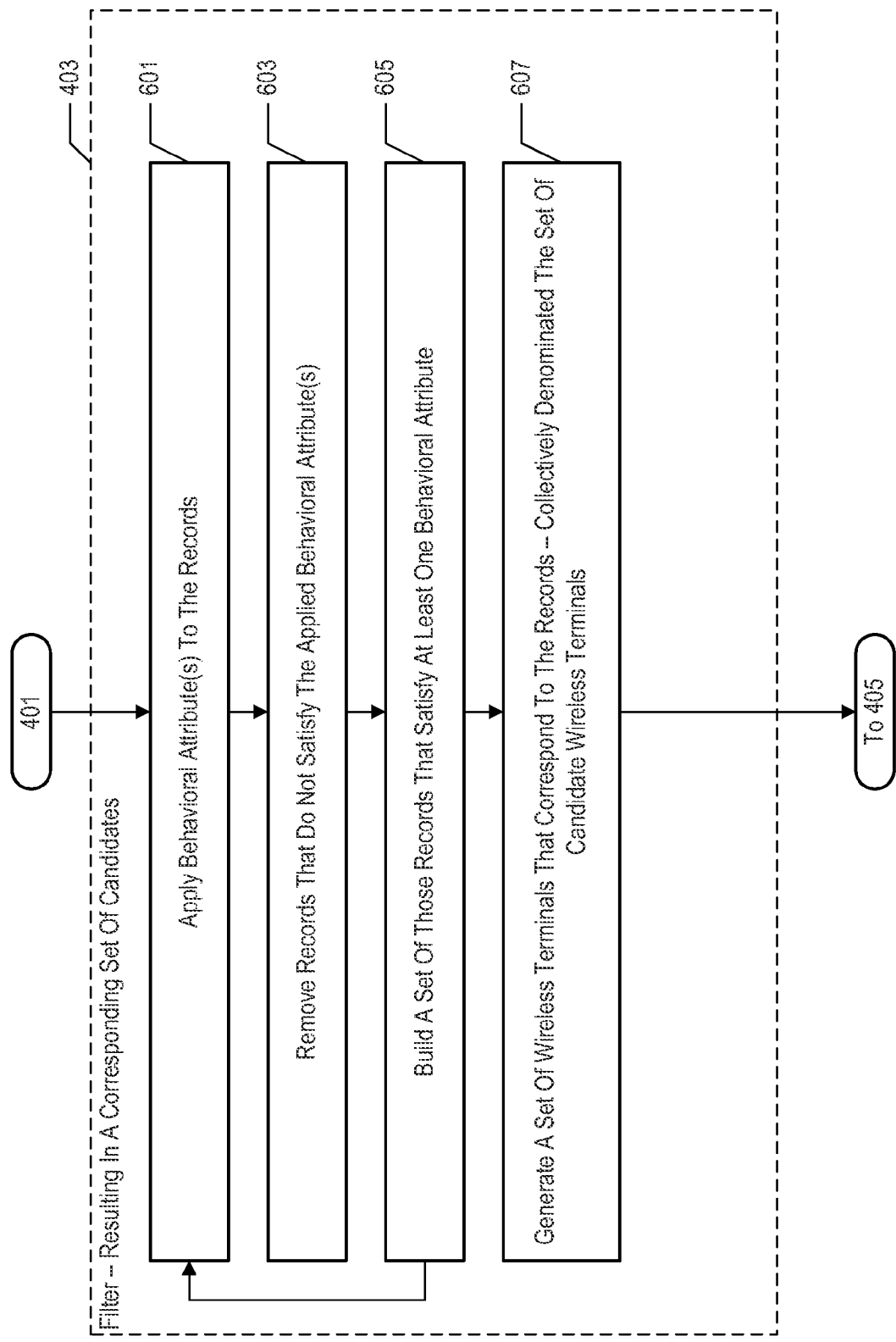
FIG. 6 depicts a flowchart of the salient sub-operations of operation 403 performed in accordance with the illustrative embodiment.

FIG. 6 depicts a flowchart of the salient sub-operations of operation 403 performed in accordance with the illustrative embodiment.

At operation 601, behavior analysis system 213 applies one or more behavioral attributes to the received records. Typically, these behavioral attributes are associated with the pre-defined pattern of behavior described in operation 511, or they are chosen because they are relevant to the investigation. Illustrative examples of behavioral attributes were given in regard to operation 511.

At operation 603, behavior analysis system 213 removes from further consideration those records that do not satisfy the applied behavioral attributes. For example, if one of the relevant attributes is a certain period of time, records that fall outside that time period would be removed according to this operation.

At operation 605, behavior analysis system 213 builds a set of records that satisfy at least one of the applied behavioral attributes. Thus, according to the illustrative embodiment, the set of records comprises those records that satisfy one or more of the behavioral attributes that are relevant to the investigation. Illustrative examples of behavioral attributes were given in regard to operation 511.

It will be clear to those having ordinary skill in the art, after reading the present disclosure, how to make and use alternative embodiments wherein, because no pre-defined pattern of behavior was received at operation 511, there are no behavioral attributes to apply to the records and hence operations 601 through 605 are skipped. It will be further clear to those having ordinary skill in the art, after reading the present disclosure, how to make and use alternative embodiments wherein, even when a pre-defined pattern of behavior was received at operation 511, behavior analysis system 213 skips operations 601 through 605.

At operation 607, behavior analysis system 213 completes the filtering operation recited in operation 403 by generating a set of wireless terminals that correspond to the relevant set of records; this set is collectively denominated the set of candidate wireless terminals, because every wireless terminal in this set is a candidate to be possibly identified as a suspect according to the operations that follow the present operation. Notably, when no pre-defined pattern of behavior was received and/or generated in operation 511, operations 601 through 605 are not executed, and therefore the set of candidate wireless terminals corresponds to all the records received in operation 401. When operations 601 through 605 are executed and some of the records are eliminated, the set of wireless terminals that is generated in the present operation comprises only those wireless terminals that have records that satisfy one or more of the applied behavioral attributes.

FIG. 7 depicts a flowchart of the salient sub-operations of operation 409 performed in accordance with the illustrative embodiment.

At operation 701, behavior analysis system 213 establishes one or more thresholds for the measures of preciseness from operations 406 and 407. Illustratively, the first threshold is sufficient to indicate a substantial similarity as between the user of the first candidate wireless terminal and the user corresponding to the pre-defined pattern of behavior. Accordingly, an illustrative first threshold of the first illustrative measure of preciseness (from operation 406) is an overall score of at least 2-out-of-3. Illustratively, the second threshold is sufficient to indicate that the user of the first candidate wireless terminal is the same as the user corresponding to the pre-defined pattern of behavior. Accordingly, an illustrative second threshold of the first illustrative measure of preciseness (from operation 406) is an overall score of 3-out-of-3.

Illustratively, the third threshold is sufficient to indicate a substantial similarity as between the user of the first candidate wireless terminal and the user of the second wireless terminal.

As before, an overall score of at least 2-out-of-3 is an illustrative third threshold. Illustratively, the fourth threshold is sufficient to indicate that the user of the first candidate wireless terminal is the same as the user of the second candidate wireless terminal. As before, an overall score of 3-out-of-3 is an illustrative fourth threshold.

At operation 703, when the measure of preciseness according to operation 406 passes the first threshold, behavior analysis system 213 infers that the user of the first wireless terminal is substantially similar to (but not necessarily the same as) the user corresponding to the pre-defined pattern of behavior. Behavior analysis system 213 accordingly generates, at operation 711, an indication that represents the inference.

At operation 705, when the measure according to operation 406 passes the second threshold, behavior analysis system 213 infers that the (first) user of the first wireless terminal is the same as the (second) user corresponding to the pre-defined pattern of behavior. Thus, behavior analysis system 213 infers that the substantial similarity from the preceding operation is sufficient to indicate identity between the first user and the second user. Behavior analysis system 213 accordingly generates, at operation 711, an indication that represents the inference.

At operation 707, when the measure according to operation 407 passes the third threshold, behavior analysis system 213 infers that the user of the first wireless terminal is substantially similar to (but not necessarily the same as) the user of the second candidate wireless terminal. Behavior analysis system 213 accordingly generates, at operation 711, an indication that represents the inference.

At operation 709, when the measure according to operation 407 passes the fourth threshold, behavior analysis system 213 infers that the (first) user of the first wireless terminal is the same as the (second) user of the second candidate wireless terminal. Thus, behavior analysis system 213 infers that the substantial similarity from the preceding operation is sufficient to indicate identity between the first user and the second user. Behavior analysis system 213 accordingly generates, at operation 711, an indication that represents the inference.

As noted in regard to the measures of preciseness, the operative thresholds also depend closely on the nature of the relevant attributes and measures of preciseness used in a given analysis, and therefore each threshold is specific to the investigation and the data that are available to behavior analysis system 213. It is therefore left to the discretion of the implementers to define the thresholds that are suitable to the needs of the investigation at hand. Furthermore, it will be clear to those having ordinary skill in the art, after reading the present disclosure, how to make and use alternative embodiments that do not use thresholds to infer substantial similarity and/or identity in operation 409, and use other well-known evaluation techniques instead of the thresholds disclosed herein, or in combination with said thresholds.

At operation 713, behavior analysis system 213 ranks the candidate wireless terminals based on how precisely the first pattern of behavior matches the second pattern of behavior and generates a corresponding ranked list. The ranking scheme is based on the measures of preciseness from operations 406 and 407. In such a scheme, candidate wireless terminal are ranked according to how precisely each one's pattern of behavior matches the pre-defined pattern of behavior and/or another candidate's pattern of behavior. Ranking candidates provides an added dimension to the analysis and tends to diminish the rate of false positives. Ranking may be used instead of the thresholds of operations 701 through 709, or in combination with them.

As noted earlier, it will be clear to those having ordinary skill in the art, after reading the present disclosure, how to make and use alternative embodiments wherein those operations described herein that depend upon a pre-defined pattern of behavior are skipped or omitted. Likewise, it will be further clear to those having ordinary skill in the art, after reading the present disclosure, how to make and use alternative embodiments wherein those operations described herein that depend upon comparing patterns of behavior between candidate wireless terminals are skipped or omitted.

It is to be understood that the disclosure teaches just some examples according to illustrative embodiments of the present invention and that many variations of the present invention can be devised by those skilled in the art after reading this disclosure. The scope of the present invention is to be determined by the following claims.

What is claimed is:

1. A system comprising:
a processor for:
    generating a first pattern of behavior of a first wireless terminal, wherein the first pattern of behavior is based on a first plurality of records that report on events associated with the first wireless terminal, and wherein some of the events are telecommunications events experienced by the first wireless terminal,
    measuring how precisely the first pattern of behavior of the first wireless terminal matches a second pattern of behavior, and
    based on the measured preciseness, inferring that a first user of the first wireless terminal is substantially similar to a second user corresponding to the second pattern of behavior; and
a transmitter for transmitting at least one of:
    (i) an indication of the inferred substantial similarity between the first user and the second user, and
    (ii) a request for a location estimate of the first wireless terminal.

2. The system of claim 1 wherein some of the events reported on in the first plurality of records are other events experienced by the first wireless terminal that are not telecommunications events.

3. The system of claim 1 wherein the processor is further for:
    generating the second pattern of behavior, wherein the second pattern of behavior is based on a second plurality of records that report on events associated with a second wireless terminal, and wherein some of the events are telecommunications events experienced by the second wireless terminal.

4. The system of claim 1 further comprising a receiver for receiving the second pattern of behavior.

5. The system of claim 1 wherein the second pattern of behavior is a pre-defined pattern of behavior.

6. The system of claim 1 wherein each record comprises a location datum that is associated with the reported-on event.

7. The system of claim 1 wherein the substantial similarity is sufficient to infer that the first user is the same as the second user.

8. The system of claim 1 wherein the second pattern of behavior is based on a telecommunications event experienced by a second wireless terminal and at least one of:
    (i) a time,
    (ii) a time period, and
    (ii) a location datum that is associated with the telecommunications event.

9. The system of claim 1 wherein the first pattern of behavior is based on a behavioral attribute comprising at least one of:
   (i) an activation of a camera that is part of the first wireless terminal,
   (ii) a range of geographical latitude traversed by the first wireless terminal,
   (iii) a range of geographical longitude traversed by the first wireless terminal,
   (iv) a number of cells in the wireless network visited by the first wireless terminal,
   (v) an online destination that was accessed by the first wireless terminal,
   (vi) an online destination that transmitted data to the first wireless terminal,
   (vii) an activation of the first wireless terminal,
   (viii) a deactivation of the first wireless terminal, and
   (ix) a financial transaction performed from the first wireless terminal.

10. The system of claim 1 wherein the second pattern of behavior is based on a behavioral attribute comprising at least one of:
   (i) a telecommunications event experienced by a second wireless terminal used by the second user,
   (ii) an activation of a camera that is part of the second wireless terminal,
   (iii) a range of geographical latitude traversed by the second wireless terminal,
   (iv) a range of geographical longitude traversed by the second wireless terminal,
   (v) a number of cells in the wireless network visited by the second wireless terminal,
   (vi) an online destination that was accessed by the second wireless terminal,
   (vii) an online destination that transmitted data to the second wireless terminal,
   (viii) an activation of the second wireless terminal,
   (ix) a deactivation of the second wireless terminal, and
   (x) a financial transaction performed from a second wireless terminal.

11. The system of claim 1 wherein at least one of:
   (A) the first pattern of behavior is based on a behavioral attribute comprising a facial recognition event of the first user in association with the first wireless terminal; and
   (B) the second pattern of behavior is based on a behavioral attribute comprising a facial recognition event of the second user in association with the second wireless terminal.

12. A method comprising:
   generating, by a data-processing system, a first pattern of behavior of a first wireless terminal, wherein the first pattern of behavior is based on a first plurality of records that report on events associated with the first wireless terminal, and wherein some of the events are telecommunications events experienced by the first wireless terminal;
   measuring, by the data-processing system, how precisely the first pattern of behavior of the first wireless terminal matches a second pattern of behavior;
   inferring by the data-processing system, based on the measured preciseness, that a first user of the first wireless terminal is substantially similar to a second user corresponding to the second pattern of behavior; and
   transmitting, by the data-processing system, at least one of:
      (i) an indication of the inferred substantial similarity between the first user and the second user, and
      (ii) a request for a location estimate of the first wireless terminal.

13. The method of claim 12 wherein some of the events reported on in the first plurality of records are other events experienced by the first wireless terminal that are not telecommunications events.

14. The method of claim 12 wherein the second pattern of behavior is one of:
   (i) generated by the data-processing system, and
   (ii) received by the data-processing system.

15. The method of claim 12 wherein each record comprises a location datum that is associated with the reported-on event.

16. The method of claim 12 wherein the substantial similarity is sufficient to infer that the first user is the same as the second user.

17. The method of claim 12 wherein the first pattern of behavior is based on a behavioral attribute comprising at least one of:
   (i) an activation of a camera that is part of the first wireless terminal,
   (ii) a range of geographical latitude traversed by the first wireless terminal,
   (iii) a range of geographical longitude traversed by the first wireless terminal,
   (iv) a number of cells in the wireless network visited by the first wireless terminal,
   (v) an online destination that was accessed by the first wireless terminal,
   (vi) an online destination that transmitted data to the first wireless terminal,
   (vii) an activation of the first wireless terminal,
   (viii) a deactivation of the first wireless terminal, and
   (ix) a financial transaction performed from the first wireless terminal.

18. The method of claim 12 wherein the second pattern of behavior is based on a behavioral attribute comprising at least one of:
   (i) a telecommunications event experienced by a second wireless terminal used by the second user,
   (ii) an activation of a camera that is part of the second wireless terminal,
   (iii) a range of geographical latitude traversed by the second wireless terminal,
   (iv) a range of geographical longitude traversed by the second wireless terminal,
   (v) a number of cells in the wireless network visited by the second wireless terminal,
   (vi) an online destination that was accessed by the second wireless terminal,
   (vii) an online destination that transmitted data to the second wireless terminal,
   (viii) an activation of the second wireless terminal,
   (ix) a deactivation of the second wireless terminal, and
   (x) a financial transaction performed from a second wireless terminal.

19. The method of claim 12 wherein at least one of:
   (A) the first pattern of behavior is based on a behavioral attribute comprising a facial recognition event of the first user in association with the first wireless terminal; and
   (B) the second pattern of behavior is based on a behavioral attribute comprising a facial recognition event of the second user in association with the second wireless terminal.

20. A system comprising:
   a receiver for receiving a plurality of records that report on events associated with wireless terminals, wherein some of the events are telecommunications events;

a processor for:
  filtering the plurality of records, thereby resulting in a corresponding set of candidate wireless terminals, and
  based on how precisely a first pattern of behavior of a first candidate wireless terminal matches a second pattern of behavior, inferring that a first user of the first candidate wireless terminal is substantially similar to a second user corresponding to the second pattern of behavior, wherein the first pattern of behavior is based on the records that are associated with the first candidate wireless terminal; and
a transmitter for transmitting at least one of:
  (i) an indication of the inferred substantial similarity between the first user and the second user, and
  (ii) a request for a location estimate of the first wireless terminal.

21. The system of claim 20 wherein some of the events reported on in the plurality of records are other events experienced by the first candidate wireless terminal that are not telecommunications events.

22. The system of claim 20 wherein the processor is further for:
  measuring how precisely the first pattern of behavior matches the second pattern of behavior, and
  ranking the candidate wireless terminals based on how precisely the first pattern of behavior matches the second pattern of behavior.

23. The system of claim 20 wherein the processor is further for generating at least one of:
  (i) the first pattern of behavior, wherein the first pattern of behavior is based at least in part on the telecommunications events experienced by the first candidate wireless terminal, and
  (ii) the second pattern of behavior, wherein the second pattern of behavior is based on the records that are associated with a second candidate wireless terminal, and wherein the second user is the user of the second candidate wireless terminal.

24. A method comprising:
  receiving, by a data-processing system, a plurality of records that report on events associated with wireless terminals, wherein some of the events are telecommunications events;
  filtering, by the data-processing system, the plurality of records, thereby resulting in a corresponding set of candidate wireless terminals;
  based on how precisely a first pattern of behavior of a first candidate wireless terminal matches a second pattern of behavior, inferring, by the data-processing system, that a first user of the first candidate wireless terminal is substantially similar to a second user corresponding to the second pattern of behavior, wherein the first pattern of behavior is based on the records that are associated with the first candidate wireless terminal; and
  transmitting, by the data-processing system, at least one of:
    (i) an indication of the inferred substantial similarity between the first user and the second user, and
    (ii) a request for a location estimate of the first wireless terminal.

25. The method of claim 24 wherein some of the events reported on in the plurality of records are other events experienced by the first candidate wireless terminal that are not telecommunications events.

26. The method of claim 24 further comprising at least one of:
  measuring, by the data-processing system, how precisely the first pattern of behavior matches the second pattern of behavior;
  generating, by the data-processing system, the first pattern of behavior, wherein the first pattern of behavior is based on the telecommunications events experienced by the first candidate wireless terminal;
  generating, by the data-processing system, the second pattern of behavior, wherein the second pattern of behavior is based on the records that are associated with a second candidate wireless terminal, and wherein the second user is the user of the second candidate wireless terminal; and
  ranking the candidate wireless terminals based on how precisely the first pattern of behavior matches the second pattern of behavior.

27. A system comprising:
a receiver for receiving a plurality of records that report on events associated with wireless terminals, wherein some of the events are telecommunications events;
a processor for (i) generating, when a first pattern of behavior of a first wireless terminal is substantially similar to a second pattern of behavior, an indication of a substantial similarity between a first user of the first wireless terminal and a second user corresponding to the second pattern of behavior, wherein the first pattern of behavior is based on the records that are associated with the first wireless terminal, and (ii) at least one of (a) measuring how precisely the first pattern of behavior matches the second pattern of behavior to determine whether the first pattern of behavior is substantially similar to the second pattern of behavior, (b) generating the first pattern of behavior, wherein the first pattern of behavior is based on the telecommunications events experienced by the first wireless terminal, (c) generating the second pattern of behavior, wherein the second pattern of behavior is based on the records that are associated with a second wireless terminal, and wherein the second user is the user of the second wireless terminal, and (d) ranking the wireless terminals based on how precisely the first pattern of behavior matches the second pattern of behavior; and
a transmitter for transmitting at least one of:
  (i) the indication of the substantial similarity, and
  (ii) a request for a location estimate of the first wireless terminal.

28. The system of claim 27 wherein some of the events reported on in the plurality of records are other events that are not telecommunications events.

29. A method comprising:
  receiving, by a data-processing system, a plurality of records that report on events associated with wireless terminals, wherein some of the events are telecommunications events;
  when a first pattern of behavior of a first wireless terminal is substantially similar to a second pattern of behavior, generating, by the data-processing system, an indication of a substantial similarity between a first user of the first wireless terminal and a second user corresponding to the second pattern of behavior, wherein the first pattern of behavior is based on the records that are associated with the first wireless terminal;
  at least one of:
    (i) measuring how precisely the first pattern of behavior matches the second pattern of behavior to determine whether the first pattern of behavior is substantially similar to the second pattern of behavior, (ii) generating the first pattern of behavior, wherein the first pattern of behavior is based on the telecommunications events experienced by the first wireless terminal,
(iii) generating the second pattern of behavior, wherein the second pattern of behavior is based on the records that are associated with a second wireless terminal, and wherein the second user is the user of the second wireless terminal, and
(iv) ranking the candidate wireless terminals based on how precisely the first pattern of behavior matches the second pattern of behavior; and transmitting, by the data-processing system, at least one of:
(i) the indication of the substantial similarity, and
(ii) a request for a location estimate of the first wireless terminal.

30. The method of claim 29 wherein some of the events reported on in the plurality of records are other events that are not telecommunications events.

\* \* \* \* \*